(12) United States Patent
Tsai

(10) Patent No.: US 8,000,598 B1
(45) Date of Patent: Aug. 16, 2011

(54) LENS BAFFLE

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/823,524

(22) Filed: Jun. 25, 2010

(51) Int. Cl.
*G03B 11/04* (2006.01)
*G02B 21/00* (2006.01)

(52) U.S. Cl. ............... 396/534; 359/611; 359/612

(58) Field of Classification Search ............ 396/534; 359/611, 612
See application file for complete search history.

(56) References Cited

U.S. PATENT DOCUMENTS

| 3,727,529 | A | 4/1973 | De Jesus et al. |
| 3,984,854 | A * | 10/1976 | Wolcott ............ 396/535 |
| 4,926,203 | A * | 5/1990 | Hata et al. ............ 396/60 |
| 5,537,262 | A * | 7/1996 | Aoki et al. ............ 359/822 |
| 5,581,412 | A | 12/1996 | Tanaka |
| 5,612,780 | A | 3/1997 | Rickenbach et al. |
| 7,158,318 | B2 | 1/2007 | Shirie |
| 7,161,749 | B2 * | 1/2007 | Sakurai et al. ............ 359/818 |
| 2009/0097124 | A1 | 4/2009 | Lundgren |
| 2009/0101293 | A1 | 4/2009 | Anderson et al. |

* cited by examiner

*Primary Examiner* — Rodney E Fuller
(74) *Attorney, Agent, or Firm* — Blakely, Sokoloff, Taylor & Zafman LLP

(57) ABSTRACT

A lens assembly includes a brush-like baffle between the lens and a transparent cover. The baffle at least partially surrounds the lens to prevent stray light from entering and causing flare or other image artifacts. If the baffle does not entirely surround the lens structure, an adjustment mechanism may be provided to rotate the baffle so as to "tune" a flare reduction effect.

7 Claims, 4 Drawing Sheets

LENS BAFFLE

BACKGROUND

1. Field

The present invention relates generally to the field of photographic lenses and, more particularly, to a lens baffle for a still or video camera in a portable electronic device.

2. Background

Cameras, and imaging systems generally, typically use sun shields, such as shades or hoods, for shielding the lens assembly from stray light. Such sun shields protrude from the imaging system, thereby adding both volume and weight. In addition to sun shields, imaging systems may use multiple baffles or vanes outside the optical path. Baffles are typically placed perpendicular to the optical path of an imaging system in order to block the propagation of stray light.

SUMMARY

Embodiments of the present invention employ a brush-like baffle between the lens assembly and a transparent cover. The baffle at least partially surrounds the lens to prevent stray light from entering and causing flare or other image artifacts. If the baffle does not entirely surround the lens structure, an adjustment mechanism may be provided to rotate the baffle so as to "tune" the flare reduction effect.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

An embodiment of the invention with reference to the appended drawings is now explained. While numerous details are set forth, it is understood that some embodiments of the invention may be practiced without these details. In other instances, well-known circuits, structures, and techniques have not been shown in detail so as not to obscure the understanding of this description.

Figure 1:
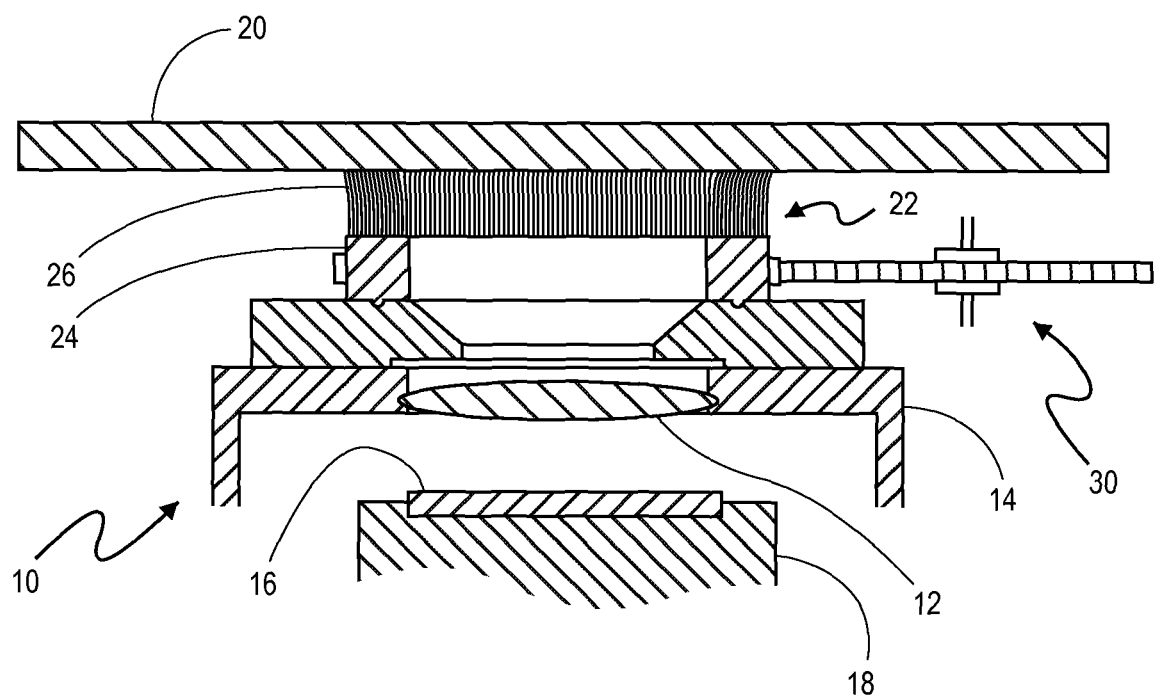
FIG. 1 is cross-sectional view of a camera lens assembly in accordance with an embodiment of the present invention.

A cross-sectional view of a camera lens assembly 10 according to one embodiment of the present invention is shown in FIG. 1. A lens 12 is held by supporting structure 14. A single lens element is shown; however, it will be understood that the lens may comprise multiple elements arranged along an optical axis. The lens 12 is supported above an image sensor chip 16, which is mounted on support member 18. The image sensor chip 16 has a sensor array (not shown) that may be located at a focal plane of the lens 12.

Figure 2:
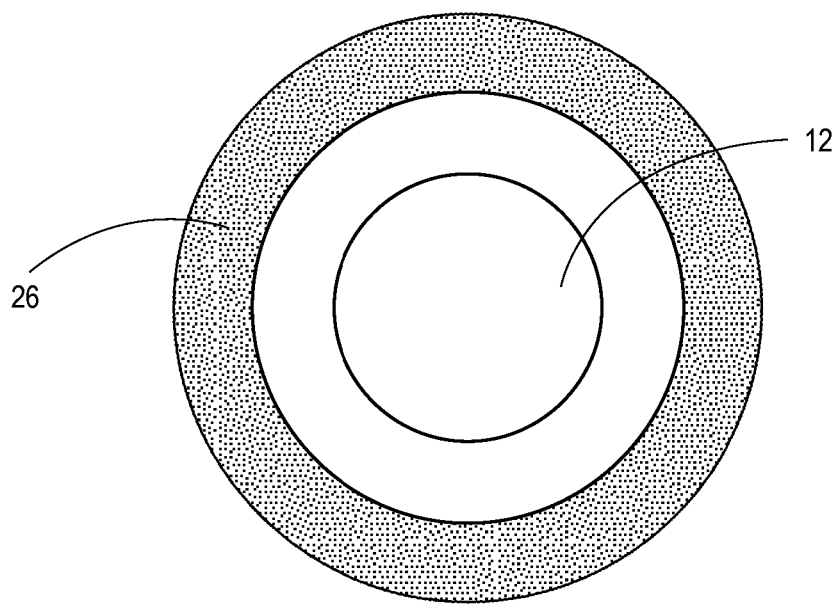
FIG. 2 is a front view of a lens baffle in accordance with one embodiment of the present invention.
Figure 3:
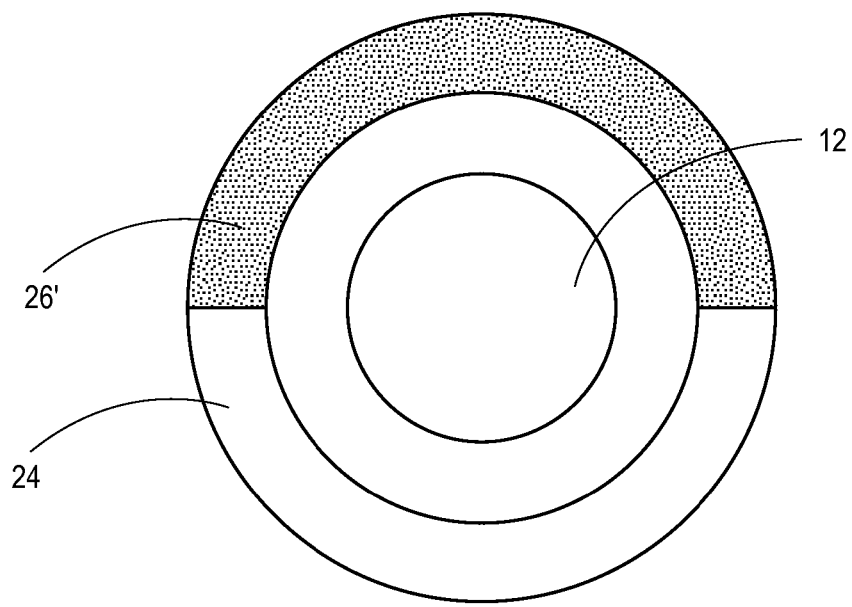
FIG. 3 is a front view of a lens baffle in accordance with another embodiment of the present invention.

Camera lens assembly 10 is disposed within a housing that includes a transparent cover or window 20 made of glass or other transparent material. The window 20 in this example is entirely flat across its rear face. Baffle 22 is placed between the lens 12 and window 20 to shield the lens from stray light (from the scene that is being captured) entering through the window. Baffle 22 comprises a support ring 24 and a brush 26 of closely spaced bristles. The bristles may comprise animal hair or any other suitable natural or artificial fibers that have been embedded into the support ring 24 at their base ends (e.g., during a plastic molding process in which the ring 24 is created). As shown in the front view of FIG. 2, the brush 26 may be substantially perpendicular to the face of the ring 24 and may form a complete circle or cylinder around lens 12. Alternatively, as shown in the front view of FIG. 3, the brush 26' may only partly surround the lens. In the latter case, an adjustment mechanism denoted generally at 30 may be provided with a user control to rotate the brush ring to as to "tune" the flare reduction effect. This may be used to advantage when photographing different types of scenes. For example, a scene photographed in sunlight should have the brush positioned at the top of the lens structure, whereas dark scenes may be captured with the brush positioned at the bottom of the lens structure.

Since the lens assembly is placed within a housing below window 20, the use of a rigid baffle would present alignment difficulties in order to have the baffle create a light-tight seal against the surface of the window. The use of a resilient baffle such as brush 26 allows for a more manageable alignment tolerance within the lens system. This is especially useful when the lens system is relatively small as in a smartphone or similarly sized portable electronic device. Note that in one embodiment, referring to FIG. 1, to prevent stray light from impinging on either the lens 12 or the sensor array that is behind it, the support structures between the ring 24 and the lens 12 should also be light-tight.

Note that the window 20 may be a completely separate piece than the baffle 22 in that the baffle 22 may be attached to neither the window 20 nor the window's support structure (not shown) in the housing. In that case, during a manufacturing process of the device, the baffle 22 may be installed into the housing, e.g. by attaching its ring 24 to the lens supporting structure 14 as shown, and then the window 20 may be installed onto the housing by being lowered into position, so that its rear face contacts the open ends of the brushes 26 to slightly compress the brushes 26 as shown, and then fixed in that position. This helps prevents stray light from reaching the lens 12 (and the image sensor array behind the lens.) Stray light includes light that enters the housing through the window 20, from areas substantially outside the brush 26 (see FIG. 2 and FIG. 3).

Figure 4:
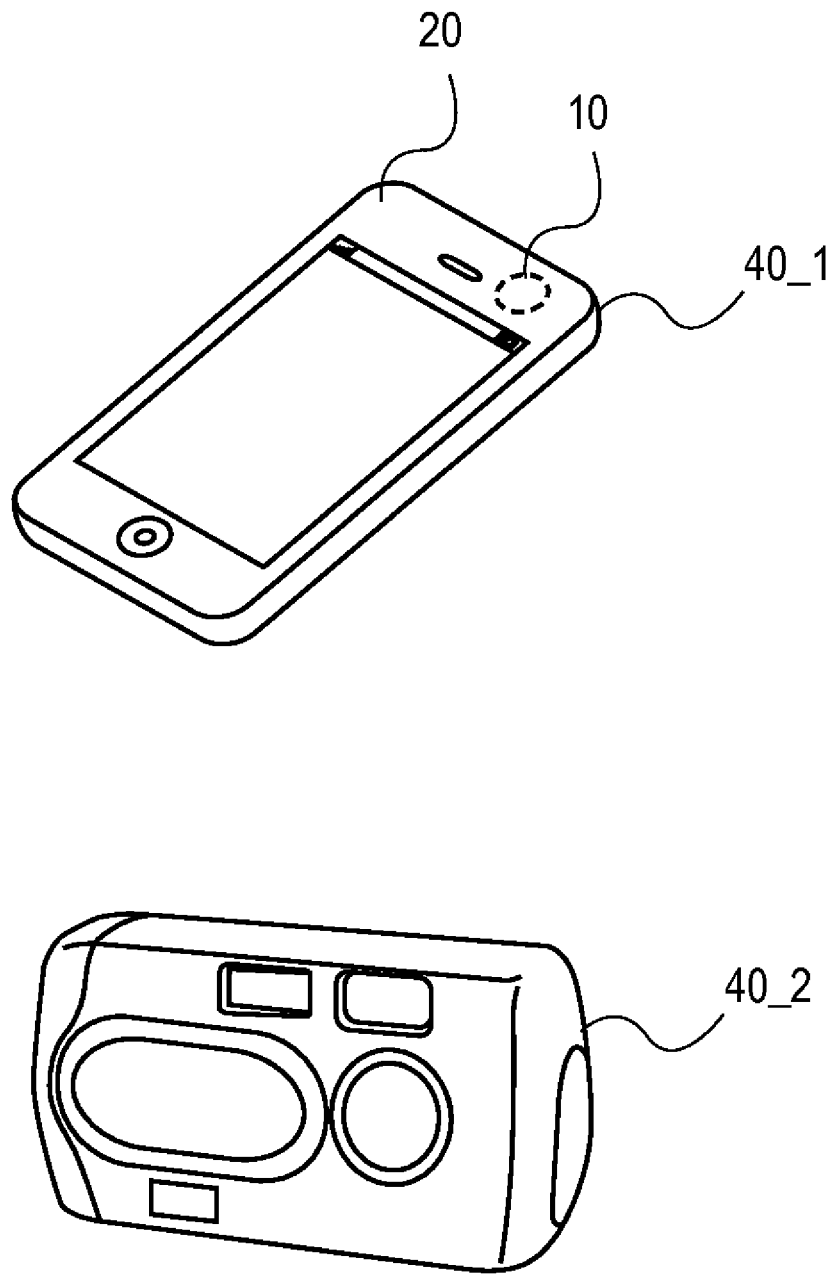
FIG. 4 depicts several types of portable camera devices in which the lens baffle can be integrated.
Figure 5:
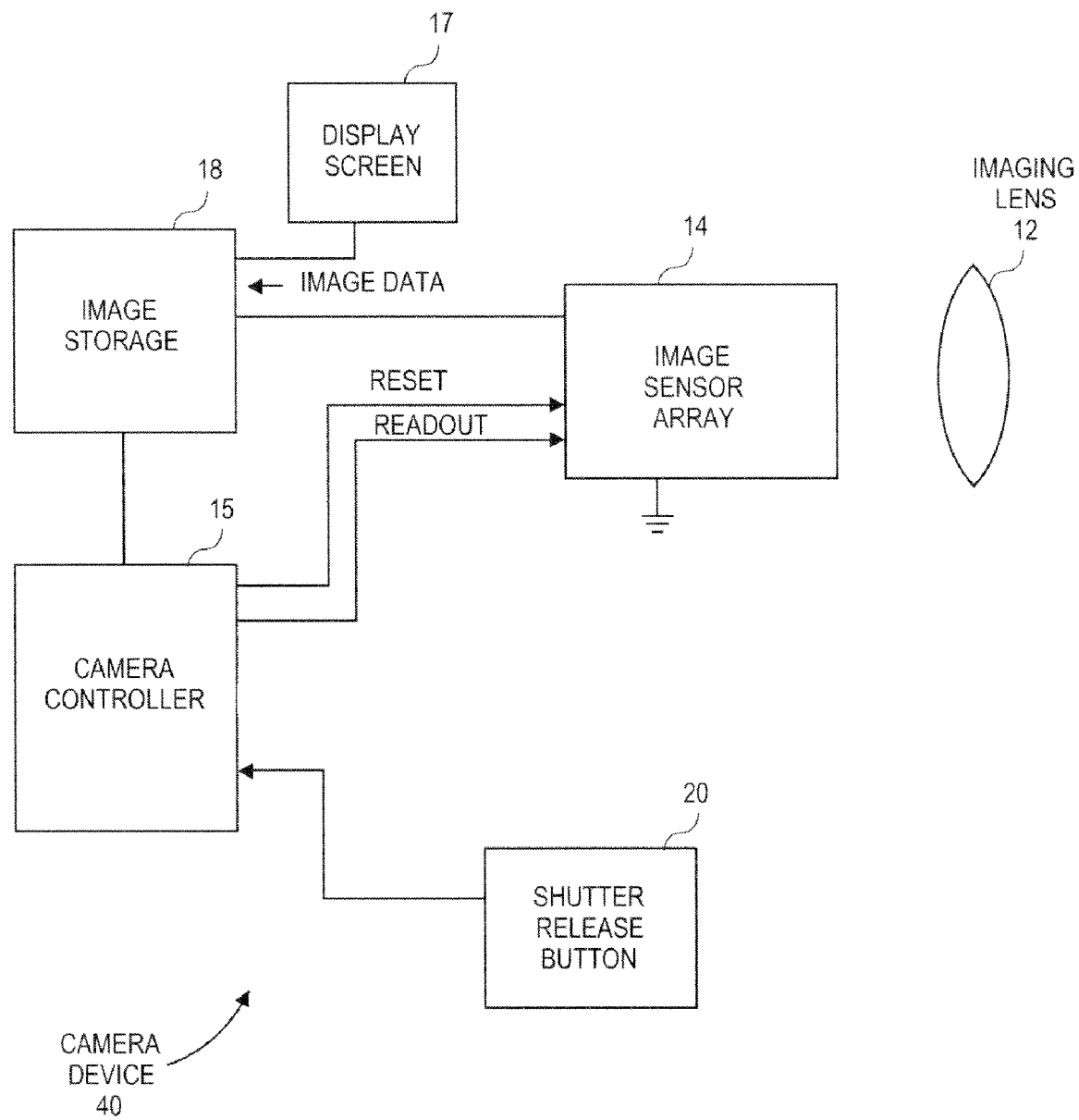
FIG. 5 is a block diagram of some constituent electronic components in a portable camera device.

FIG. 4 depicts two types of a portable camera device 40 in which the lens baffle can be integrated, namely a multi-function smart phone device 40_1 such as an iPhone™ device by Apple Inc., and a dedicated personal digital camera device 40_2. The device 40_1 in this case has an exterior front face defined in part by the window 20; behind it the camera lens assembly 10 is shown in dotted lines. Note that the window 20 may be a fairly large piece that forms substantially the entire front face of the device 40 as shown. A second camera lens assembly 10 (not shown) may also be included that faces out of a similar window 20 that defines in part, or in its entirety, the exterior rear or back face of the housing of the device 40_1. A combined circuit schematic and block diagram of some relevant constituent electronic components of a portable camera device 40 is given in FIG. 5.

The device 40 may be any one of several different types of small consumer electronic devices that can be easily held in the users hands during normal use, such as a camera (mobile) phone, and a tablet-like computer such as an iPad™ device by Apple Inc. The lens baffle may also be integrated into a notebook personal computer or a desktop personal computer, both of which typically have a built-in digital camera. The digital camera functionality is obtained using a microelectronic image sensor array 14 on which light from the scene to be captured has been gathered by the imaging lens 12. Although not shown in FIG. 4, the baffle 22 may be positioned in front of the lens 12 and behind the window 20 (see FIG. 1), while the sensor array 14 is positioned behind the lens 12. A mechanical shutter (not shown) may be included in front of the sensor array 14 and behind the baffle 22, to control the duration of exposure. Alternatively, an entirely electronic shutter may be implemented using the sensor array's reset and readout signals. The sensor array 14 responds to the incident light and collects photo-generated charge or forms image signals during an integration interval (or exposure interval) defined by the reset and readout signals. At the end of the integration interval, the image signals are read (including being digitized) and transferred as a captured digital image or "exposure", to image storage 18. The image storage 18 may include sufficient non-volatile memory suitable to store many digital images captured by the sensor array 14.

A camera controller 15 (e.g., implemented as a combination of programmed data processing components and hard-wired logic circuitry) can manage the process of taking exposures. It does so by generating various commands that are signaled to the components of the camera device 40, in response to a user of the device 40 actuating a shutter release button 20, to take an exposure. The button 20 may be a physical button on an outside surface of the housing of the device 40, or it may be a virtual button displayed on a touch screen of the device 40. The camera 40 includes a viewfinder function that lets the user see a just-captured image on an integrated display screen 17.

The invention is not limited to the specific embodiments described above. There are numerous variations to different aspects of the invention described above, which in the interest of conciseness have not been provided in detail. Accordingly, other embodiments are within the scope of the claims.

What is claimed is:

1. A camera lens assembly comprising:
a lens;
a transparent lens cover;
a baffle disposed between the lens and lens cover, the baffle at least partially surrounding the lens and having a brush-like array of bristles extending from the lens to contact the lens cover.

2. The camera lens assembly of claim 1 further comprising an adjustment mechanism to rotate the baffle around an axis of the lens.

3. The camera lens assembly of claim 1 wherein the baffle completely surrounds the lens.

4. A portable electronic device having a camera function comprising:
a housing;
a transparent window in the housing;
a camera lens;
a baffle disposed between the camera lens and the transparent window, the baffle at least partially surrounding the lens and having a brush-like array of bristles extending from the lens to contact the transparent window.

5. The portable electronic device of claim 4 further comprising an adjustment mechanism to rotate the baffle around an axis of the lens.

6. The portable electronic device of claim 4 wherein the baffle completely surrounds the lens.

7. The portable electronic device of claim 4 wherein the transparent window forms substantially an entire front or rear exterior face of the device.

* * * * *